(12) United States Patent
Bartoli et al.

(10) Patent No.: US 10,793,346 B2
(45) Date of Patent: Oct. 6, 2020

(54) CAPSULE FOR BEVERAGES

(71) Applicant: SARONG SOCIETA' PER AZIONI, Reggiolo (Reggio Emilia) (IT)

(72) Inventors: Andrea Bartoli, Reggio Emilia (IT); Davide Capitini, Reggio Emilia (IT); Mattia Solieri, Cavezzo (IT)

(73) Assignee: SARONG SOCIETA' PER AZIONI, Reggiolo (IT)

( * ) Notice: Subject to any disclaimer, the term of this patent is extended or adjusted under 35 U.S.C. 154(b) by 138 days.

(21) Appl. No.: 15/767,939

(22) PCT Filed: Oct. 21, 2016

(86) PCT No.: PCT/IB2016/056333
§ 371 (c)(1),
(2) Date: Apr. 12, 2018

(87) PCT Pub. No.: WO2017/068535
PCT Pub. Date: Apr. 27, 2017

(65) Prior Publication Data
US 2018/0305115 A1    Oct. 25, 2018

(30) Foreign Application Priority Data
Oct. 22, 2015   (IT) .................. 102015000064537

(51) Int. Cl.
*B65D 85/804*   (2006.01)
*A47J 31/40*    (2006.01)

(52) U.S. Cl.
CPC ......... *B65D 85/8043* (2013.01); *A47J 31/407* (2013.01)

(58) Field of Classification Search
CPC ................. B65D 82/8043; A47J 31/407
See application file for complete search history.

(56) References Cited

U.S. PATENT DOCUMENTS

| 7,798,054 | B2 | 9/2010 | Evers et al. |
| 8,784,915 | B2 | 7/2014 | Evers et al. |

(Continued)

FOREIGN PATENT DOCUMENTS

| WO | 2005077811 A2 | 8/2005 |
| WO | 2012004256 A1 | 1/2012 |

(Continued)

*Primary Examiner* — Viren A Thakur
*Assistant Examiner* — Chaim A Smith
(74) *Attorney, Agent, or Firm* — Pearne & Gordon LLP

(57) ABSTRACT

A capsule comprises a casing (202) that includes: a base wall (203) and a side wall (204) defining a cavity (205) that is suitable for containing a food preparation (P); a flange-shaped edge (206) extending from the side wall (204), the side wall (204) being deformable along preset lines of pliability (219, 220) to enable the casing (202) to be compressed along a direction (A) that is transverse to the base wall (202). The capsule (201) further comprises: a cover element (208) fixed to the flange edge (206) to close the cavity (205) hermetically and a nozzle (210; 310), fixed to the cover element (208), which is housed in the cavity (205). The nozzle (210; 310) comprises: a first end (211; 311) and a second end (212; 312) that are opposite; a first portion (213; 313) that includes the first end (211; 311), is arranged for receiving injection means of fluid (F) and comprises a plurality of openings (213a; 313a) for supplying the fluid (F) from the injection means to the cavity (205); a second portion (214; 314) that includes the second end (212; 312), extends through the outlet opening (207) and comprises a first tubular part (214a; 314a) with a constant section, and a second part (214b; 314b) that is shaped with respect to the first part (214a; 314a), in which the second portion (214; 314) further comprises an outer flange (215; 315) that peripherally surrounds the second end (212; 312) and closes the outlet opening (207) when the capsule (201) is in a first, undeformed, configuration (K). The outer flange (214; 314)

(Continued)

of the nozzle (210; 310) is configured for pushing the closing element (209) outwards to open the capsule (201), when the capsule (201) is compressed to pass from the first configuration (K) to a second, deformed, configuration (J). Moreover, the second part (214b; 314b) of the nozzle (210; 310) is configured for projecting beyond the base wall (203) of the capsule (201) when the capsule (201) is further compressed passing from the second configuration (J) to a third' configuration (E), which is deformed further. In addition, the second part (214b; 314b) of the nozzle (210; 310) is shaped into a divergent form so as to guide outwards the food preparation (P) that exits the outlet opening (207) pushed by the pressurised fluid (F) when the capsule (201) is in the second configuration (J) or in the third configuration (E).

11 Claims, 3 Drawing Sheets

(56) References Cited

U.S. PATENT DOCUMENTS

| | | | |
|---|---|---|---|
| 9,493,297 | B2 | 11/2016 | Bartoli et al. |
| 9,567,155 | B2 | 2/2017 | Bartoli et al. |
| 9,580,235 | B2 | 2/2017 | Rondelli |
| 9,676,538 | B2 | 6/2017 | Evers et al. |
| 9,771,210 | B2 | 9/2017 | Bartoli et al. |
| 9,771,211 | B2 | 9/2017 | Bartoli et al. |
| 2008/0148948 | A1 | 6/2008 | Evers et al. |
| 2010/0326283 | A1 | 12/2010 | Evers et al. |
| 2013/0105340 | A1 | 5/2013 | Hother et al. |
| 2014/0026761 | A1 | 1/2014 | Bartoli et al. |
| 2014/0161937 | A1 | 6/2014 | Rondelli |
| 2014/0302204 | A1 | 10/2014 | Evers et al. |
| 2014/0335232 | A1 | 11/2014 | Halachmi |
| 2015/0068405 | A1 | 3/2015 | Bartoli et al. |
| 2015/0072052 | A1 | 3/2015 | Bartoli et al. |
| 2015/0344219 | A1 | 12/2015 | Bartoli et al. |
| 2017/0036855 | A1 | 2/2017 | Bartoli et al. |
| 2017/0036856 | A1 | 2/2017 | Bartoli et al. |

FOREIGN PATENT DOCUMENTS

| | | |
|---|---|---|
| WO | 2012104760 A1 | 8/2012 |
| WO | 2012117383 A1 | 9/2012 |
| WO | 2013121421 A1 | 8/2013 |
| WO | 2013132450 A1 | 9/2013 |
| WO | 2013156932 A1 | 10/2013 |
| WO | 2014102701 A1 | 7/2014 |

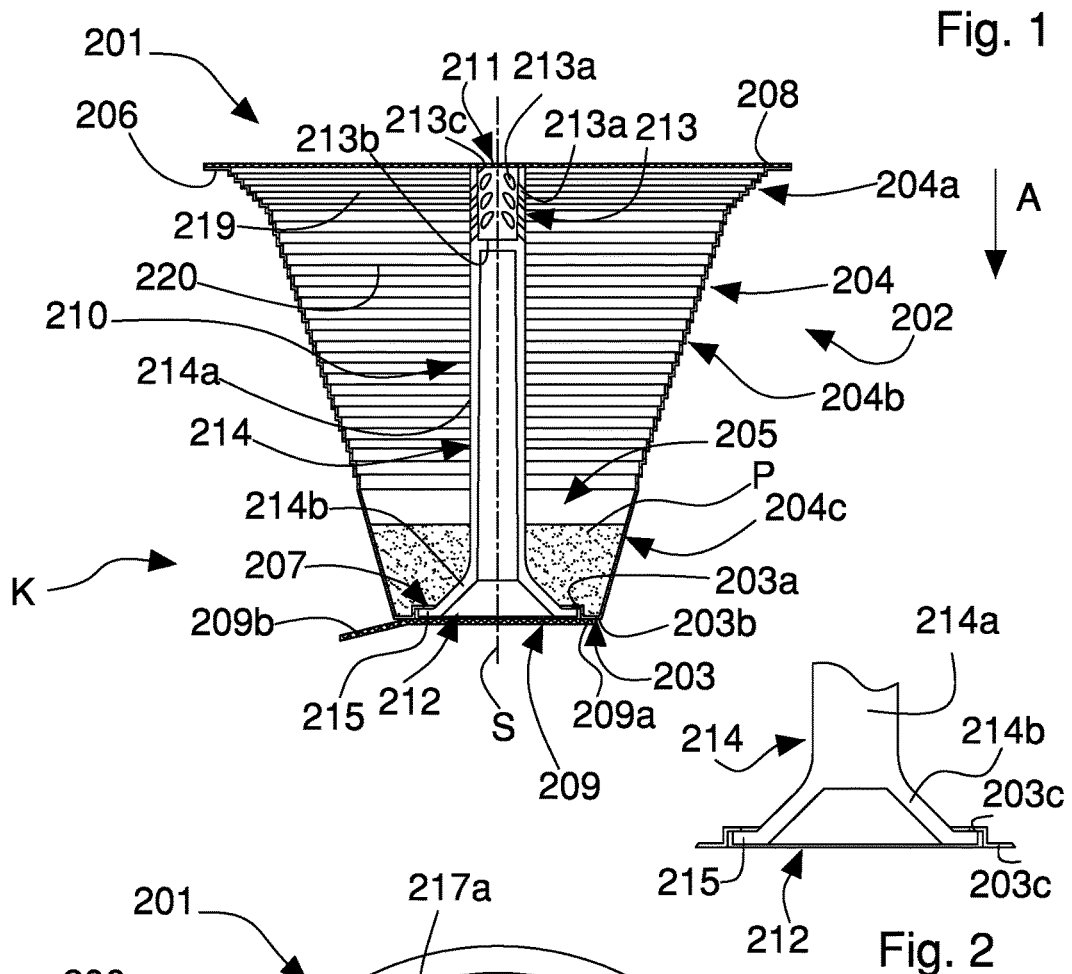
Fig. 1
Fig. 2
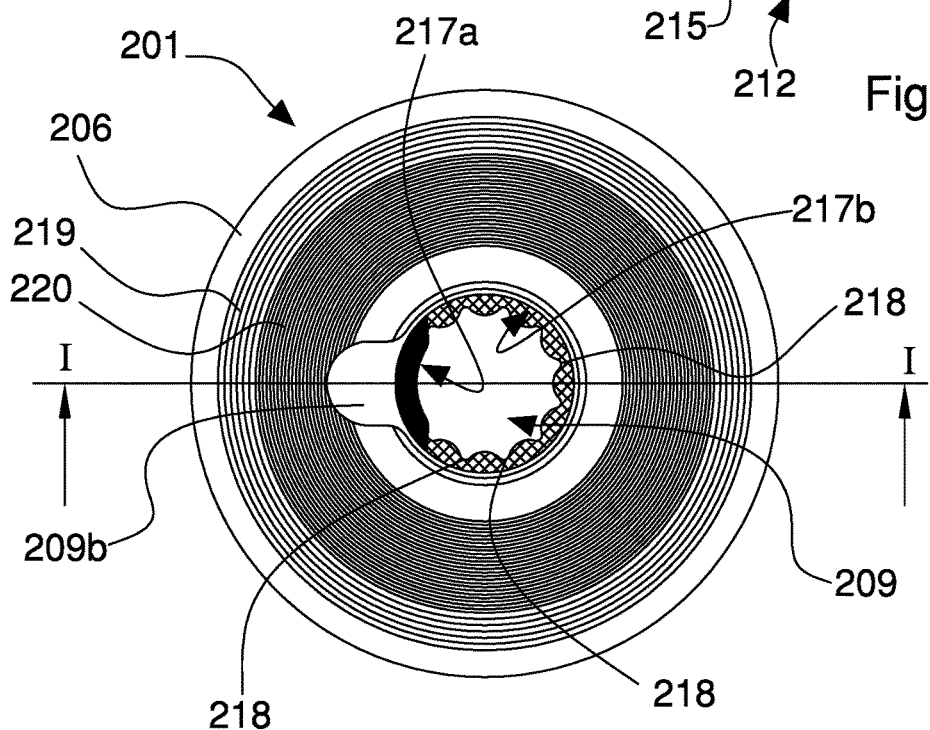
Fig. 3

CAPSULE FOR BEVERAGES

The invention relates to capsules or containers, containing a food preparation, which are usable in machines for dispensing a food product, and further relates to a method for using such capsules in an automatic dispensing device.

More in detail, the invention relates to a sealed single-dose and disposable capsule containing a food preparation, which may be in powder or in the form of a syrup, which is able to dispense by a pressurised fluid the food preparation, which is optionally dissolved or diluted for subsequent uses.

If the food preparation is in powder, it can be soluble or be lyophilised or dehydrated.

Alternatively, if it is, for example, a syrup or a cream, it can be a concentrate.

The food preparation, dispensed by the capsule, can, for example, also be optionally dissolved or diluted with a hot or cold liquid, typically water or milk.

Capsules are known for beverages that are usable in dispensing machines.

Known capsules are disposable and single-dose containers comprising an outer casing, made of plastics that are impermeable to liquids and gases and having a glass or cup shape. In particular, the casing has a bottom wall and a side wall defining a cavity provided with an upper opening through which a preparation can be inserted from which to obtain a beverage. The upper opening is closed hermetically by a cover, typically a film containing aluminium or a multilayered film of plastics, so as to seal the preparation inside the cavity of the container. The cover of the capsule is perforable by injection means of the dispensing machine to enable the pressurised liquid, typically water, to be delivered, with which to prepare the beverage.

With regard to dispensing of the obtained beverage, the bottom wall of the casing can also be perforable by extracting means of the dispensing machine, to enable the beverage to be dispensed.

Alternatively, capsules for beverages are also known, for example disclosed in application WO2014102701 of the same applicant, which are able to dispense the beverage directly into a use container (cup, glass, etc.) without the need for perforation by the extracting means of the dispensing machine.

The known capsules disclosed above enable the beverage to be obtained by percolating the liquid through the food preparation (typically coffee) or by solubilising or dissolving the preparation (for example tea, herbal tea, etc.) and are marked by the interaction of the food preparation contained in the capsule with a liquid delivered thereinto, to prepare the beverage directly inside the capsule and dispense the thus formed beverage.

Such capsules are nevertheless not very suitable for dispensing also a viscous, syrup or creamy food preparation.

Capsules for beverages are also known, come for example shown in WO2005077811, that enable a viscous food preparation to be dispensed into a cup, to which also hot or cold water is supplied, to dilute the food preparation in the cup and thus obtain a beverage. The capsule shown by WO2005077811 comprises a crushable body provided with a cavity, which is closed by a cover fixed to a flange edge of the capsule, inside which there is a syrup (concentrated coffee, chocolate or fruit syrup) that exits from the cover of the capsule when the capsule is compressed and crushed. In detail, the cover breaks at a welding portion, enabling the food preparation to be poured into the cup.

The capsules disclosed are thus typically associated with specific dispensing machines in which liquid injection means or beverage dispensing means are present that are suitably designed to be compatible with a certain type of capsule and not with others. These capsules are usually used in dispensing machines of reduced dimensions and are usually designed for domestic use, and it is the consumer who, at the moment of purchase, establishes that machine system plus capsules preferred by him for the envisaged used.

These capsules might nevertheless not be suitable for being used in machines for dispensing a food product of another type, which is made by recipes that require one or more ingredients, inasmuch as supplying food preparations with different types of formulation might be required by the capsule.

For example, certain recipes could require a powder preparation to be received from the capsule, others could require supplying a syrup preparation, still others could require a preparation that is already diluted with milk or with water. Some recipes could in addition require solid products, for example a plurality of elements such as fragments of biscuits or drops of chocolate or nuts in ground or whole form.

WO2013121421 shows a machine for ice cream for obtaining ice cream in a single dose from one or more containers that are insertable into the machine, containing the necessary ingredients. Several embodiments of the same machine are provided, a first embodiment that is configured for housing "dry" containers in which the preparation contained therein is to be diluted with a liquid and for which connection to the water supply or to a tank of liquid is provided (the usable container has a cover and a bottom that are both perforable), and a second embodiment that is on the other hand configured for housing "wet" containers in which the preparation does not require delivery of a liquid in which it is itself diluted (the usable container has only a perforable bottom).

The machine for ice cream shown by WO2013121421 can also prepare ice cream with combinations of ingredients from two different containers, which are connectable to one another by wedging, for example to join a first container containing a preparation of ice cream and a second containing toppings like drops of chocolate.

WO2013121421 thus provides different capsules in terms of dimension and content to supply to the machine for ice cream a food preparation of different formulation and thus several embodiments of the same machine are required, each version specifically provided for one type of capsule.

It should nevertheless be noted that the capsule can dispense a food preparation that is already mixed with water or milk but cannot dispense a pasty food preparation, such as, for example, a typical base for ice cream used in artisanal ice-cream parlours, or a powder food preparation.

One object of the present invention is to propose a sealed, disposable and single-dose capsule that is able to dispense a food preparation contained therein for successive uses.

A further different object is to obtain an extremely versatile capsule, which is able to dispense a food preparation in powder, in syrup, diluted or not, pasty or solid products, which is usable in a dispensing device that is suitable for receiving the capsule and expelling the food preparation contained therein, together with a pressurised fluid.

Such objects and still others are achieved by a capsule according to one or more of the claims set out below.

The invention can be better understood and implemented with reference to the attached drawings that illustrate some embodiments thereof by way of non-limiting example, in which:

FIG. 1 is a view of the capsule according to the invention in a first configuration that is undeformed and sectioned by a plane passing through the line I-I of FIG. 3, showing a nozzle housed in a cavity of the capsule;

FIG. 2 is an enlarged detail of a part of FIG. 1;

FIG. 3 is a view from the bottom of the capsule in FIG. 1;

Below, the same elements will be indicated by the same numbers in the various figures.

Figure 4:
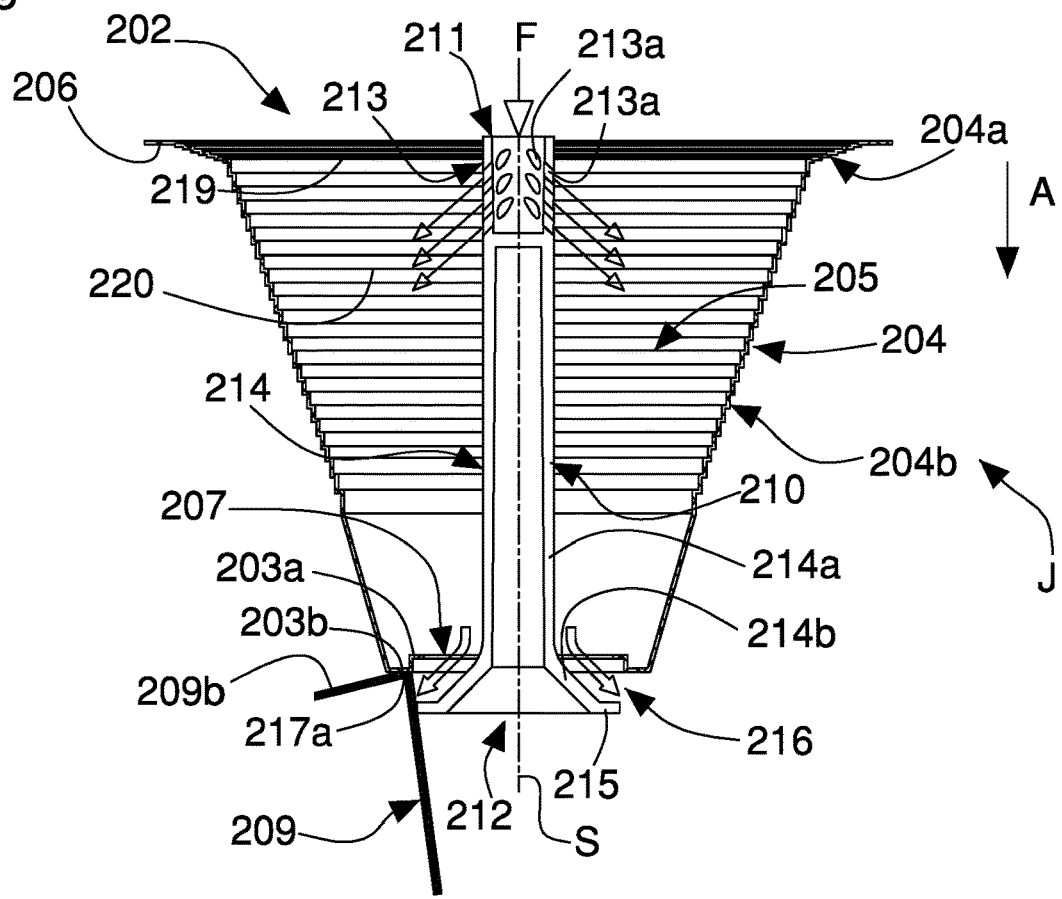
FIG. 4 is a view of the capsule in FIG. 1 in a second configuration, that is deformed, sectioned by a plane passing through an axis of symmetry of the capsule.

With reference to FIGS. 1 to 5, a capsule 201 is illustrated according to the invention containing a food preparation P that is usable in an automatic dispensing device for dispensing by a pressurised fluid the food preparation, optionally dissolved or diluted, for subsequent uses.

The food preparation P can be, for example, a food product in powder (soluble, lyophilised, dehydrated, concentrated, percolable, for infusion) or can be a product in the form of a syrup, cream or concentrated paste.

The capsule 201 comprises a casing 202 that includes in turn: a base wall 203 and a side wall 204, defining a cavity 205 that is suitable for containing the food preparation P; a flange-shaped edge 206 that extends from the side wall 204, in particular surrounding the cavity 205.

The base wall 203 further comprises an outlet opening 207 for the exiting of the food preparation P from the capsule 201.

The side wall 204 is, further, divergent from the base wall 203 to the edge 206 and has, for example, an almost frustoconical shape, such as to give the casing a glass or cup shape.

The casing 202 is compressible and/or crushable and is thus deformable. The casing is made by forming a thermoformable material, in particular multilayer plastics that are impermeable to liquids and gases and are suitable for contact with foodstuffs.

In order to enable the casing 202 to be compressed and crushed along a direction A almost parallel to a longitudinal axis of symmetry S of the capsule 1 and substantially orthogonal to the base wall 203, the side wall 204 is deformable along predefined pliability lines, for example in a concertina shape or bellows shape, as will be seen better below.

The compressible and/or crushable casing 202 enables a volume of the casing to be reduced progressively, reducing the distance between the base wall 203 and the flange edge 206, during dispensing of the food preparation P.

The capsule 201 further comprises a cover element 208 fixed to the flange edge 206 to close the cavity 205 hermetically and a closing element 209 fixed in a partially detachable manner at least to the base wall 203 to close the outlet opening 207 hermetically.

The capsule 201 further comprises a nozzle 210, housed at least partially in the cavity 205 and fixed to the cover element 208, which comprises a first end 211 and a second end 212 that are opposite.

The nozzle 210 comprises a first portion 213, that includes the first end 211, is arranged for receiving fluid F injection means (not shown) of an automatic dispensing device (not shown) and comprises a plurality of supplying openings 213a, for supplying the fluid F from the injection means of the dispensing device to the cavity 205. The fluid F injection means of the automatic dispensing device F can thus engage in the first portion 213. The first portion 213 is hollow and has a base wall 213b that is devoid of openings and a side wall 213c on which the plurality of openings 213a are distributed.

The fluid F can, for example, be a pressurised hot liquid, for example water, with which the food preparation is diluted and/or dissolved at the moment of dispensing.

Advantageously and preferably, as will be seen better, the fluid F is pressurised air, with which the food preparation is expelled at the moment of dispensing, as will be seen better below.

The nozzle 210 further comprises a second portion 214 that includes the second end 212, extends through the outlet opening 207 and comprises a first tubular part 214a with a constant section, and a shaped second part 214b. The second portion 214 further comprises an outer flange 215 that peripherally surrounds the second end 212 and closes the non-sealed outlet opening 207, when the capsule 201 is in an initial undeformed first configuration K in which the capsule has not yet been compressed.

The outer flange 215 of the nozzle 210 is configured in such a way as to exert a thrust against the closing element 209, pushing the closing element 209 outwards and detaching the closing element 209 at least partially to open the capsule 210, when the capsule is compressed and passes from the first configuration K to a second configuration J, in which the capsule is deformed.

The second part 214b of the nozzle 210 is further configured for projecting beyond the base wall 203 of the capsule 201 when the capsule 201 is further compressed and passes from the second configuration J to a third configuration E, which is deformed further.

It should be noted that the second part 214b of the shaped nozzle has a divergent shape, in particular is in the shape of a cone as illustrated in the figures, with respect to the first part 214a, to guide suitably outside the food preparation P that exits the outlet opening, pushed by the pressurised fluid F, when the capsule is in the third configuration E.

Advantageously, in addition to the conical shape, the second part 214b could be bell-shaped or the like (not shown).

With particular reference to FIG. 2, in the first configuration K of the capsule 202, the nozzle 210 is arranged inside the cavity 205 with the second end 212 that partially exits the cavity 205 through the outlet opening 207 made in the base wall 203.

The nozzle 210 is inserted and can slide without interference in the outlet opening 207. In fact, the base wall 203 comprises an inner annular portion 203a surrounding the outlet opening 207 into which the nozzle 210 is inserted and can slide. An annular opening 216 is present between the annular edge 203a and the second portion 214 of the nozzle 210, through which the food preparation P can exit the capsule 201, when the capsule is in the second configuration J or is in the third configuration E.

In the first configuration K of the capsule 201, the outer flange 215 abuts on an outer surface of the base wall 203. It should further be noted that the base wall 203 is not flat but shaped and comprises a recess 221 (FIG. 5), containing the outlet opening 207.

In detail, the outer flange 215 abuts on the inner annular portion 203a arranged in the recess 221, towards the cavity 205.

The recess 221 houses the outer flange 215 of the nozzle 210 and in this manner the closing element 209 can be advantageously welded on an outer annular portion 203b of the base wall 203, which is flat. As a result, in the first configuration K the outer flange 215 is arranged between the outer surface of the base wall 203 and the closing element 209.

The cover element 208 is perforable, in particular by the injection means of the dispensing device, to enable the latter to engage in the first portion 213 of the nozzle 210 and deliver the fluid F into the capsule through the openings 213a of the nozzle 210. The first end 211 of the nozzle 210 is fixed by welding to the cover element 208 to create a fluid seal between the cover element 208 and the first portion 213 and further collaborate with the outlet opening 207 to maintain in position inside the cavity 205 the nozzle 210.

In this manner the fluid F received in the first portion 213 is dispensed to the containing cavity of the preparation P only through the openings 213a of the first portion 213 and undesired leaks of the fluid F are avoided at the first end 211.

The second portion 214 of the nozzle 210 is also preferably hollow, to make the nozzle 210 lighter and avoid the use of unnecessary plastics.

If the second portion is hollow, the base wall 213b of the first portion is a separating baffle between the first portion 213 and the second portion 214, which is thus also a head wall of the second portion 214. In order to distribute more effectively the fluid F through the openings 213a, the base wall 213b is parallel to the base wall 203 of the casing 202 of the capsule 201 and the openings 213a are tilted. With respect to the side wall 213c, parallel to the longitudinal axis S of the capsule 201, the openings 213a are tilted by an angle comprised in a range from 20° to 45° and preferably 30°, so as to direct respective jets of fluid F to the base wall 203 of the capsule 201.

Figure 6:
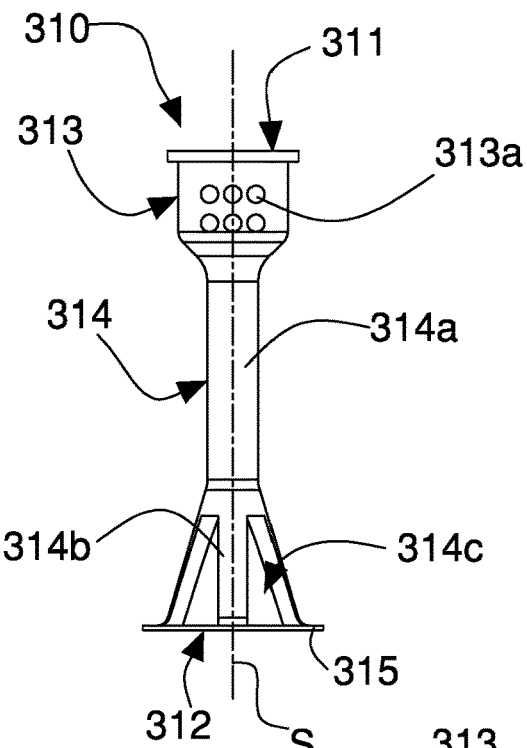
FIG. 6 is a front view of a version of the nozzle of FIG. 1, which is housable in the cavity of the capsule.
Figure 7:
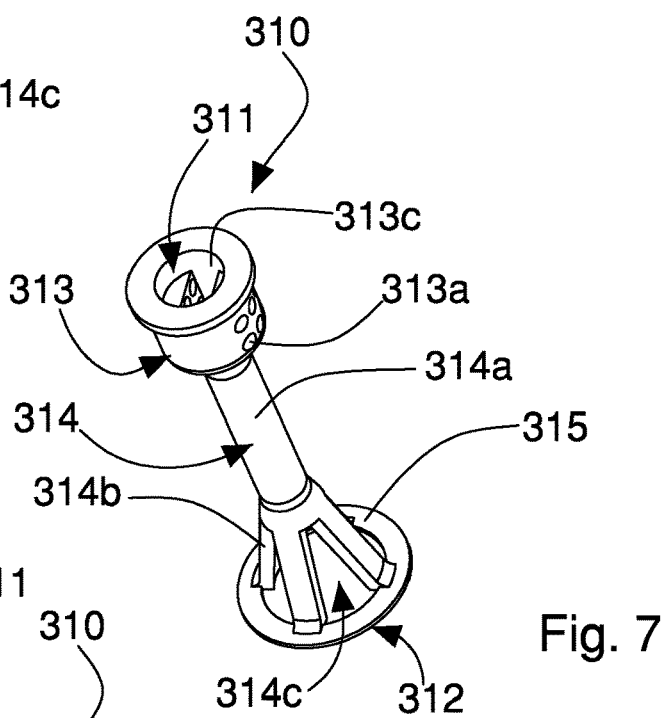
FIG. 7 is a perspective view of the nozzle di FIG. 6.
Figure 8:
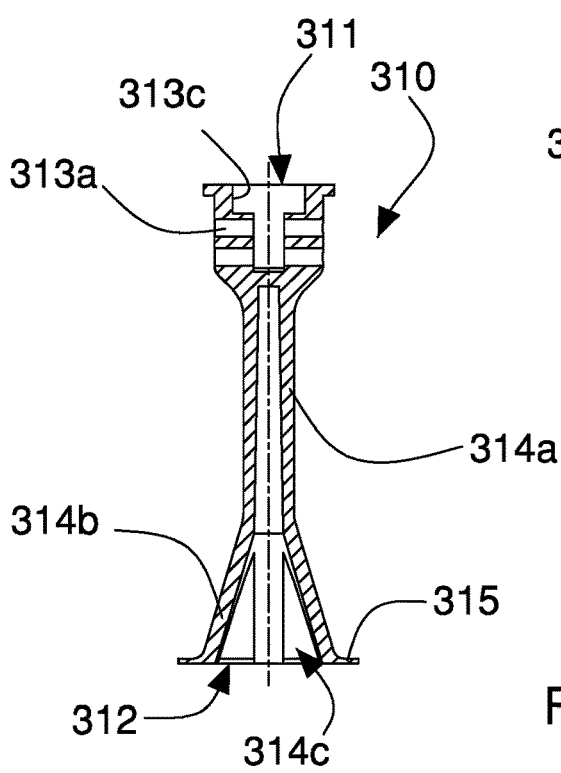
FIG. 8 is a view of the nozzle di FIG. 6, sectioned by a plane passing through an axis of symmetry of the nozzle.

FIGS. 6, 7, and 8 show a version of the nozzle 310 that can be housed advantageously in the capsule 201 of the invention. The nozzle 310 comprises a first end 311 and a second end 312 that are opposite. The nozzle 310 further comprises a first portion 313, that includes the first end 311, is arranged for receiving the fluid F injection means (not shown) and comprises a plurality of supplying openings 313a, distributed in a side wall 313c, for supplying the fluid F from the injection means to the cavity 205 of the capsule 201.

The nozzle 310 differs from the nozzle 210 of FIGS. 1 to 5 because the openings 313a are perpendicular to an axis of symmetry S of the nozzle 310 and are not tilted.

The nozzle 310 further comprises a hollow second portion 314 that includes the second end 312 and comprises a first tubular part 314a with a constant section, and a shaped second part 314b, of divergent shape. FIGS. 6 to 8 show a second part 314b of a conical shape, that could be alternatively made in the shape of a bell or the like (not shown). The second portion 314 further comprises an outer flange 315 that peripherally surrounds the second end 312.

It should be noted that the nozzle 310 differs from the nozzle 210 of FIGS. 1 to 5 inasmuch as it comprises a plurality of outlet openings 314c, distributed angularly in the shaped second part 314b of the nozzle 310, to enable the food preparation P to exit the cavity 205 not only guided by the shape of an outer surface of the second portion 314 but also therethrough, when the capsule is in the second configuration J or in the third configuration E.

It has been said that the closing element 209 is provided for closing hermetically the outlet opening 207 and insulating the cavity 205 from the outer environment.

As shown in FIG. 1 and in FIG. 3, the closing element 209, which is for example disc-shaped element, comprises a joining edge 209a, for example an annular joining edge 209a, by means of which it is removably fixed to the outer annular portion 203b of the base wall 203. The closing element 209 can be easily detached from the base wall 203 in automatic mode by the nozzle 210 in a first step of partial compression of the casing 202 in which the capsule 201 passes from the first configuration K to the second configuration J.

The closing element 209 can be further easily detached from the base wall 203 by a user manually before inserting of the capsule 201 into the dispensing device, and in this case, according to a preferred embodiment, an elongated tab 209b is provided that extends outwards from a connecting portion of the joining edge 209a.

The closing element 209, provided with or devoid of the tab 209b, is made of plastics, or aluminium that is weldable, for example thermally or by ultrasound, and the joining edge 209a is in particular fixed to the outer annular portion 203b of the base wall 203 for a first section 217a by locking welding and for a second section 217b by peelable welding, the locking welding requiring greater force than the peelable welding to detach the joining edge 209a from the base wall 203, so as to promote the detachment of the second section 217b of the joining edge 209a before detachment of the first section 217a.

The first section 217a extends in a first angular range comprised between 80° and 100°, in particular preferably 100°, and the second section 217b extends in a second angular range that is explementary to the first angular range, in other words the first section 217a and the second section 217b extend over the entire joining edge 209a.

If the closing element 209 is provided with the elongated tab 209b, the connecting portion of the joining edge 209a extends from the first section 217a fixed with locking welding, for reasons that will be seen better below.

The second section 217b fixed by peelable welding comprises detachment promoting means for facilitating gradual and progressive separating of the joining edge 209a from the base wall 203, which comprises at least one detachment portion 218, at which the second section 217b has a substantially "V" or wedge shape.

Preferably, the detachment promoting means comprises a plurality of detachment portions 218 that are angularly equidistant in the second section 217b, to distribute the effectiveness of this detachment along the entire second section 217b.

On the other hand, the first section 217a fixed by the locking welding is devoid of the detachment promoting means and thus, although both the locking welding and the peelable welding enable the closing element 209 to be fixed removably to the base wall 203, the locking welding requires greater force than the peelable welding to enable the first section 217a to detach from the second section 217b.

If only one detachment portion 218 (not shown) is present, the latter is positioned in the second section 217b along an axis of symmetry S of the first section 217a, on an opposite side to the first section 217a and to the tab 209b, if present.

When the closing element 209 is pushed by the nozzle 107 and detached in automatic manner, the first section 217a remains connected to the base wall 203 and acts as a hinge element about which the portion of the closing element 209 comprising the second section 217a of the joining edge 209a can rotate, away from the base wall 203.

Both the cover element 208 of the cavity 205 and the closing element 209 of the outlet opening 207 are made of selected materials, for example multilayer foil-line packages of plastics, so as to protect over time the food preparation P contained in the capsule from humidity and from oxygen. Such multilayer plastic materials can for example contain aluminium or a different barrier layer, for example ethylene vinyl alcohol (EVOH) or polyvinylidene chloride (PVDC). If they contain, for example, aluminium, they cannot be considered to be recyclable plastics and must therefore be separated from the remaining plastics making up the capsule for the purpose of disposal of the waste.

The side wall 204 comprises a first zone 204a that is contiguous to the flange edge 206 provided with a first group of first pliability lines 219, a second zone 204b that is continuous with the first zone 204a provided with a second group of second pliability lines 220 and a third zone 204c extending from the second zone 204b as far as the base wall 203 optionally provided with a third group of third pliability lines (not shown).

The first pliability lines 219, the second pliability lines 220 and optionally the third pliability lines are parallel to one another and parallel to the base wall 203 of the capsule 201 to enable the casing 202 to be compressed along the direction that is transverse to the base wall 203.

The distance, measured along the longitudinal axis S of the capsule 201, between the first pliability lines 219 is less than the distance between the second pliability lines 220.

If the third pliability lines are present, the distance measured along the longitudinal axis S between the second pliability lines 220 is less than the distance between the third pliability lines.

In other words, the first pliability lines 219 are nearer than the second pliability lines 220 and the third pliability lines, if present, such that the casing 202 can be initially compressed and deforms at the first zone 204a.

The third pliability lines are very distant from one another and optionally only a limited number of third pliability lines is provided for the purpose that will be explained below.

In use, the use of the capsule 201 of the invention in an automatic dispensing device envisages the insertion of the capsule, being the capsule in the first configuration K which is undeformed, into the dispensing device, in particular into a suitable seat of the dispensing device. The dispensing device can be part of a more complex dispensing machine, as will be seen below.

It is pointed out that although reference is made below to a capsule 201 comprising the nozzle 210, of FIGS. 1 to 5, the same considerations are also valid for the nozzle 310, of FIGS. 6 to 8.

In a first step of partial compression of the casing 202, the nozzle 210 slides into the outlet opening 207 and the outer flange 215, pushing the closing element 209 outwards, enables the closing element 209 to detach at least partially.

In fact, the detachment promoting means 218 facilitates the gradual and progressive separation of the joining edge 209a of the closing element 209 from the base wall 203 at the second section 217b, which is fixed by peelable welding. The portion of the closing element 209 comprising the second section 217b rotates away from the base wall 203 around the first section 217a, still connected to the base wall 203 inasmuch as it is fixed by locking welding, which acts as a hinge line of the closing element 209.

The side wall 204 is compressed at the first zone 204a, owing to the first pliability lines 219, which are close. In this manner, the volume of the casing 202 is reduced, as shown in FIG. 4, inasmuch as the capsule 201 passes from the first configuration K, which is undeformed, to the second configuration J, which is compressed.

The nozzle 210 exits the base wall 203 by a limited quantity and between the annular edge 203a of the base wall 203 and the second portion 214 of the nozzle 210 the annular opening 216 forms, through which the food preparation P can start to exit the capsule 201. The annular opening 216 has in this first compression step a reduced dimension but a detachment of the closing element 209, even if partial, allows the cavity 205 to be in connection with the external environment, through the annular opening 216.

In a first injection step, the injection means of the dispensing device perforates the cover element 208 and engages the first portion 213 so as to be able to supply, subsequently, pressurised fluid F to the cavity 205 through the openings 213a.

The first injection step is preferably performed before the first compression step.

In a second compression step of the capsule 202, the entire second part 214b of the second portion 214 protrudes beyond the base wall 203 of the capsule 201 when the capsule 201 is further compressed.

Figure 5:
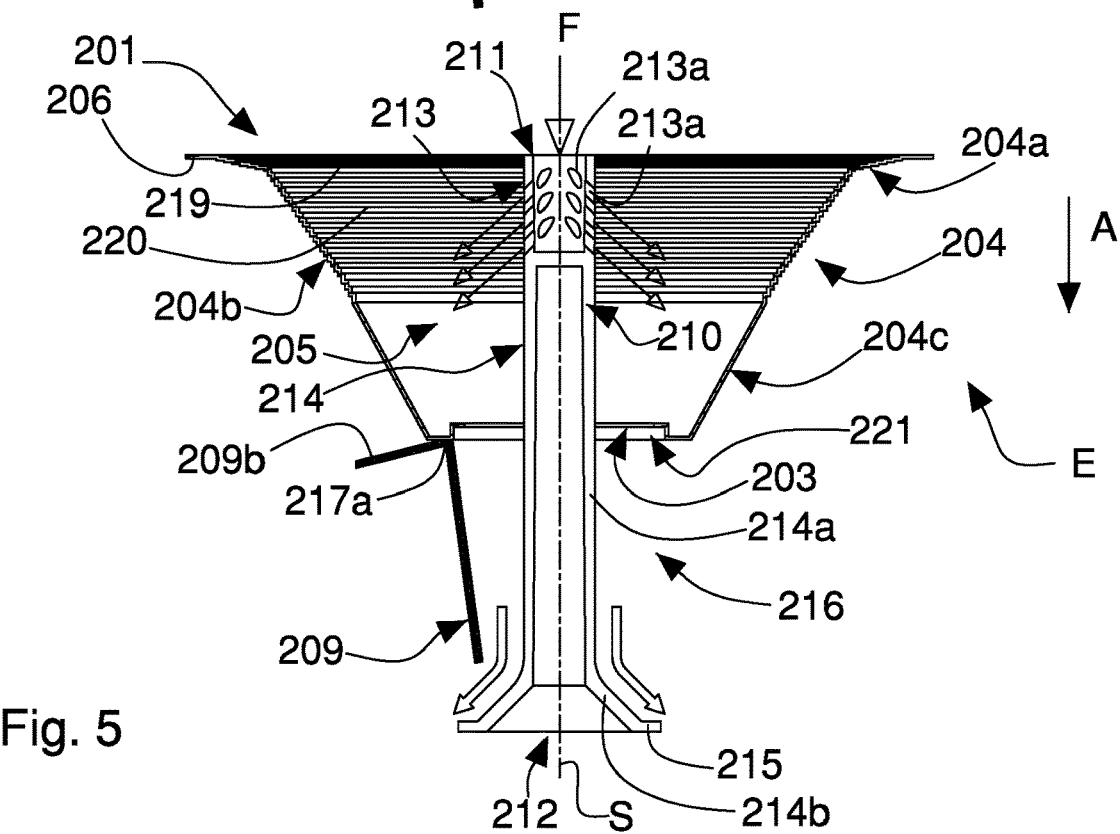
FIG. 5 is a view of the capsule in FIG. 1 in a third configuration, that is deformed, sectioned by a plane passing through an axis of symmetry of the capsule.

The side wall 204 is compressed at the second zone 204b, owing to the second pliability lines 220. In this manner the volume of the casing 202 is reduced still further, as shown in FIG. 5, inasmuch as the capsule 201 passes from the second configuration J to a third final compression configuration E, in which the capsule 201 is deformed further and has minimum volume.

In a second injection step, pressurised fluid F, a liquid or air, is introduced through the nozzle 210.

The pressurised fluid F, if liquid, can interact with the food preparation P for example by diluting or dissolving the food preparation P and any way mixing therewith to form gradually a diluted and/or dissolved food preparation P that is expelled through the outlet annular opening 216, pushed by the pressurised liquid.

If advantageously the pressurised fluid is air, the food preparation P is pushed through the outlet opening and dispersed into the delivered air for subsequent uses.

The pressure and the temperature of the fluid F delivered into the cavity 205 have to be suitably adjusted according to the type and composition of the food preparation P.

The second injection step follows, preferably, the first compression step and is advantageously performed also during the second compression step.

In other words, if the capsule 201 is open and is thus arranged in the second configuration J or in the third configuration E, the injection means of the dispensing machine can be driven to supply pressurised fluid F to the capsule 201 and expel the food preparation P contained therein. The pressurised fluid F is supplied only when the capsule is open.

It should be noted that the second part 214b of the shaped nozzle 210, has a divergent shape, in particular a conical shape (or alternatively a bell or similar shape), and guides to the food preparation P pushed by the pressurised fluid F outwards, when the capsule 201 is open and thus when the capsule is in the second configuration J or in the third configuration E.

The outlet annular opening 216 increases in size when the capsule passes from the second configuration J to the third configuration E and has maximum size when the second compression step has finished.

Advantageously further, as said previously, the third zone 204c is devoid of pliability lines or, if present, the third pliability lines are at a great distance from one another. The third zone 204c, devoid of pliability lines, acts as a funnel to promote and direct the exit of the food preparation P.

The third pliability lines can be optionally provided to facilitate the complete compression of the capsule 202 if it is advisable to provide, for example, a third compression step, following the second compression step, in which the capsule is deformed further and is compressed to a third compression configuration, of still more reduced volume. The third pliability lines, if present in the third zone 204c, do not compromise the exit of the food preparation P.

It is thus possible to define a method for dispensing a food preparation P into an automatic dispensing device by the capsule 201 of the invention, comprising the following steps:

- in a first injection step, there is the step of engaging injection means of fluid F of an automatic dispensing device in the first portion 213 of the nozzle 210, in particular perforating the cover element 208 of the capsule 201, which has been previously arranged in a seat of the dispensing device, in such a manner that the first portion 213 receives said injection means; in this first injection step pressurised fluid F is not yet supplied;
- in a first step of partial compression of the casing 202, the step is provided of deforming the side wall 204 of the casing 202 of the capsule 201 along preset pliability lines 219, 220, in particular by compressing the capsule 201 along a direction A that is transverse to a base wall 203 of the casing 202 to make the capsule pass from the first configuration K, which is undeformed, to the second, deformed, configuration J, and further in such a manner as to slide the nozzle 210 into the outlet opening 207 of the base wall 203, the outer flange 215 of the nozzle 210 pushing the closing element 209 outwards and opening the capsule 201; the outer flange 215 thus detaches the closing element 209 at least partially at the second section 217b, in which the joining edge 209a is fixed to the base wall 203 with peelable welding;
- in a second injection step, following the first compression step, there is the step of supplying pressurised fluid F, for example a liquid or air, through a plurality of openings 213a of the first portion 213 to a cavity 205 of the capsule (201), in particular in such a manner that the fluid F can interact with the food preparation P contained with the capsule 201 mixing therewith and can push the food preparation P through the outlet opening 207;
- in a second compression step of the capsule 201, simultaneous with or preceding the second injection step, there is the step of further deforming the capsule 201, compressing the capsule, to pass the capsule 201 from the second configuration J to a third configuration E, in which the capsule 201 is deformed further, and the step is provided of further sliding the nozzle 210 into the outlet opening 207 such as to project a second part 214b beyond the base wall 203 of the capsule 201, the second part 214b guiding the food preparation P pushed by the pressurised fluid F through the outlet opening 207 when the capsule 201 is in the second configuration J or in the third configuration E.

Owing to the capsule 201 according to the invention, it is possible to dispense the food preparation P contained therein for successive uses, regardless of the type of food preparation P.

The pressurised fluid F introduced into the capsule 201 enables in the same manner a creamy, a powder, or diluted or non-diluted syrup food preparation to be expelled. It is added that the food preparation P can also comprise a solid product, can comprise a single solid element (for example a biscuit) or a plurality of solid elements (whole or ground nuts, puffed cereals, drops of chocolate). The dimension (length, width or height) of such solid element/s can be great, inasmuch as the solid element/s is/or required only to pass through the outlet annular opening 216 between the inner annular edge 203a and the nozzle 210.

The capsule 201 according to the invention can be used to supply the food preparation P to a machine for ice cream and advantageously air can be used as a pressurised fluid to expel the food preparation P from the capsule 201.

The ice cream is in fact a foodstuff obtained by incorporating air inside a liquid mixture, in a batch freezing step, during cooling of the mixture itself and supplying the food preparation P mixed and/or diffused in air can thus be advantageous. The food preparation P, which is received from a batch freezer of a machine for ice cream mixed with air, can be combined with a liquid directly in the batch freezer to create the liquid mixture already containing air, before the start of cooling of the mixture.

In this manner, it could be possible to obtain a creamy ice cream, a fruit sorbet or a semifreddo dessert always using the same type of capsule 210 according to the present invention, the injection means of fluid F evaluating the use of air and/or liquid to dispense the food preparation P from the capsule 201 to the batch freezer according to the recipe to be followed. It should be noted that, advantageously, the capsule is able to expel a pasty food preparation P as well as a powder food preparation.

In addition to the use of the capsule in a machine for ice cream, it could be advantageous to use the capsule also in a machine for preparing a beverage, for example for preparing beverages containing gas from a concentrate of fruit or from a dehydrated fruit powder. Supplying the capsule carbon dioxide for foodstuffs, i.e. E290 carbon dioxide, or with cold water that already contains gas, it could be possible to expel the fruit concentrate into a consumption glass in the formulation to be diluted or in the already diluted formulation, according to the consumer's preference.

The capsule 201 of the invention can thus be used on a dispensing device devoid of a dispensing circuit as this capsule does not require extracting means that is suitable for perforating the bottom thereof, to enable the preparation mixed with the fluid F to exit.

The absence of the dispensing circuit and further the versatility of the capsule 201, which is usable in several different applications, make the dispensing device simple and cheap and further ensure the hygiene of the dispensing process and the maintenance of the quality of the dispensed food preparation P.

Another advantage of the capsule 201 of the invention lies in the fact that it prevents the injection means of the dispensing device coming into contact with the food preparation P, both in the first injection step and in the second injection step, as the nozzle 210 is set up for being engaged, by the first portion 213, by the injection means of the dispensing device.

The supplying circuit of the dispensing device, comprising the injection means, is thus not dirtied or contaminated with the food preparation P and/or with the diluted food preparation, this ensuring the hygiene of the dispensing process and enabling the same injection means to be used to supply air or a liquid.

The dispensing device can in this manner be advantageously integrated into different types of dispensing machine to prepare complex food products.

The invention claimed is:

1. Capsule, comprising:
   a casing that includes:
      a base wall and a side wall defining a cavity that contains a food preparation;
      a flange-shaped edge extending from the side wall;
      wherein the side wall is deformable along preset lines of pliability to enable the casing to be compressed along a direction that is transverse to the base wall; and
      wherein the base wall comprises an outlet opening for the exiting of the food preparation from the capsule;
      wherein the capsule further comprises:
         a cover element fixed to the flange edge for closing hermetically the cavity;
         a closing element fixed in a partially detachable manner at least to the base wall for closing hermetically the outlet opening;
   a nozzle fixed to the cover element, wherein the nozzle comprises:
      a first end and a second end that are opposite from each another;
      a first portion that includes the first end and comprises a plurality of openings for supplying air to the cavity;
      a second portion that includes the second end extends through the outlet opening and comprises a first tubular part with a constant section, and a second part that gradually flairs out towards the end of the second part with respect to the first part, wherein the second portion further comprises an outer flange that peripherally surrounds the second end and closes the outlet opening when the capsule is in a first, undeformed, configuration,
      wherein the first portion of the nozzle comprises a base wall that is devoid of openings and is a separating baffle between the first portion and the second portion;
      wherein the outer flange of the nozzle is configured for pushing the closing element outwards to open the capsule, when the capsule is compressed to pass from the first configuration to a second, deformed, configuration; and
      the second part of the nozzle is configured for projecting beyond the base wall of the capsule when the capsule is further compressed by passing from the second configuration to a third configuration, which is deformed further, and
      the second part of the nozzle is shaped into a divergent form so as to guide the food preparation that exits the outlet opening pushed by pressurised air when the capsule is in the second configuration or in the third configuration; and
   the base wall of the capsule comprises an inner annular edge surrounding the outlet opening of the base wall of the capsule into which the nozzle is inserted and slides into the outlet opening;
   wherein when the capsule is in the second configuration or in the third configuration, between the annular edge and the second portion of the nozzle there is defined an annular opening through which the food preparation exits the cavity, and the first tubular part of the nozzle is devoid of openings
   and the second part of the nozzle comprises a side wall provided with a plurality of outlet openings to enable the food preparation to exit the capsule also through the second part when the air is delivered into the cavity, the second portion of the nozzle being hollow.

2. Capsule according to claim 1, wherein the side wall further comprises:
   a first zone that is contiguous with the flange edge, which is provided with a first group of first lines of pliability;
   a second zone that is contiguous with the first zone provided with a second group of second lines of pliability;
   a third zone extending from the second zone to the base wall, which is optionally provided with a third group of third lines of pliability.

3. Capsule according to claim 2, wherein the first lines of pliability, the second lines of pliability and optionally the third lines of pliability are parallel to one another and parallel to the bottom wall of the capsule to enable the casing to be compressed along the direction that is transverse to the base wall.

4. Capsule according to claim 3, wherein a distance, measured along a longitudinal axis of the capsule, between the first lines of pliability is less than a distance between the second lines of pliability.

5. Capsule according to claim 4, wherein the distance measured along a longitudinal axis of the capsule, between the second lines of pliability is less than the distance between the third lines of pliability.

6. Capsule according to claim 1, wherein the cover element is perforable and is fixed by welding to the first end of the nozzle to create a fluid seal between the cover element and said first end.

7. Capsule according to claim 1, wherein the closing element comprises a joining edge that includes a first section and a second section, wherein the first section is fixed to an external annular portion of the base wall by a blocking seal and wherein the second section is fixed by a peelable seal, wherein the blocking seal requires greater force than the peelable seal to detach the joining edge from the base wall so as to promote the detachment of the second section before the detachment of the first section, when in a first compression step the outer flange of the nozzle pushes the closing element outwards.

8. Capsule according to claim 1, wherein the outer flange abuts on an inner annular portion of the base wall in the first configuration of the capsule; and
   wherein the base wall of the capsule comprises a recess containing the outlet opening,
   wherein the recess houses the outer flange of the nozzle.

9. Method of using the capsule according to claim 1 to dispense a food preparation, wherein the method comprises the following steps:
   in a first step of partially compressing the casing of the capsule, a step is provided of deforming the side wall of the casing along predefined lines of pliability to compress the casing along a direction that is transverse to a base wall of the casing, so as to bring the capsule from a first, undeformed, configuration, to a second, deformed, configuration, and further so as to slide the nozzle out from the outlet opening of the base wall so that an outer flange of the nozzle pushes a closing element of the base wall outwards and opens the capsule;

in an injection step, after the first compression step, a step is provided of supplying pressurised air, through a plurality of openings of the first portion of the nozzle to the cavity of the capsule;

in a second step of compressing the capsule, simultaneously with or before the injection step, a step is provided of deforming further the side wall to bring the capsule from the second configuration to the third configuration, so as to project the second part of the second portion of the nozzle beyond the base wall of the capsule, the second part of the nozzle guiding the food preparation pushed by the pressurised air through the outlet opening, when the capsule is in the second configuration or in the third configuration.

10. Method of using the capsule according to claim 1 containing a food preparation in a machine for ice-cream, comprising:

supplying a pressurised fluid to the capsule to create a food preparation;

expelling the food preparation from the capsule mixed and/or diffused in the pressurised fluid;

supplying the food preparation mixed and/or diffused in the pressurised fluid to a batch freezer of the ice-cream machine;

combining the food preparation with a liquid inside the batch freezer to create a liquid mixture containing air;

cooling the liquid mixture to obtain the ice-cream, wherein said combining is made before the start of the cooling the liquid mixture.

11. Method according to claim 10, wherein said food preparation is in pasty or powder form.

\* \* \* \* \*